United States Patent [19]

O'Shea

[11] Patent Number: 4,632,626
[45] Date of Patent: Dec. 30, 1986

[54] TRAILER FOR LOADING AND HAULING AGRICULTURAL BINS

[76] Inventor: Kenneth E. O'Shea, 2251 Road #9 NW., Quincy, Wash. 98848

[21] Appl. No.: 710,583

[22] Filed: Mar. 11, 1985

[51] Int. Cl.⁴ .............................................. B60P 1/18
[52] U.S. Cl. .................... 414/476; 280/43.23; 414/480; 414/491; 414/499; 414/527
[58] Field of Search ............... 414/473, 474, 475, 476, 414/480, 482, 483, 484, 485, 491, 492, 493, 494, 495, 497, 498, 499, 500, 527, 528, 537, 538, 559; 280/43.23, 43.16, 43.17, 43.13, 43

[56] References Cited

U.S. PATENT DOCUMENTS

| | | |
|---|---|---|
| 1,862,682 | 6/1932 | Judd . |
| 1,924,797 | 8/1933 | Mitchell . |
| 2,173,277 | 9/1939 | Jarmin et al. . |
| 2,513,855 | 7/1950 | Fogwell ............................ 414/476 |
| 2,587,624 | 3/1952 | Johnson ...................... 280/43.23 X |
| 2,684,021 | 7/1954 | Ratzlaff . |
| 2,765,941 | 10/1956 | Mamo . |
| 3,185,330 | 5/1965 | Buckner . |
| 3,228,727 | 1/1966 | Paulson ...................... 280/43.23 X |
| 3,271,042 | 9/1966 | Flodin ............................ 414/495 X |
| 3,381,768 | 5/1968 | Neely, Jr. .................. 280/43.23 X |
| 3,690,491 | 9/1972 | Butler, Jr. ............................ 414/483 |
| 3,735,884 | 5/1973 | Klett ...................................... 414/498 |
| 3,945,521 | 3/1976 | Decker . |
| 4,063,745 | 12/1977 | Olson ............................ 414/476 X |
| 4,101,144 | 7/1978 | Ross et al. .................. 280/43.23 X |
| 4,290,733 | 9/1981 | Lahman ............................. 414/476 |

FOREIGN PATENT DOCUMENTS 1906165 10/1969 Fed. Rep. of Germany .

*Primary Examiner*—Frank E. Werner
*Attorney, Agent, or Firm*—Keith S. Bergman

[57] ABSTRACT

A trailer structure, having a mechanical loading system, to transport bins especially as used for agricultural products. The rearward portion of the trailer is lowered for bin pick up and loading, without raising the forward portion of the trailer, by a bell-crank type wheel mounting system. The trailer provides a unitary side-beam type frame and is mechanically powered by hydraulic devices.

3 Claims, 7 Drawing Figures

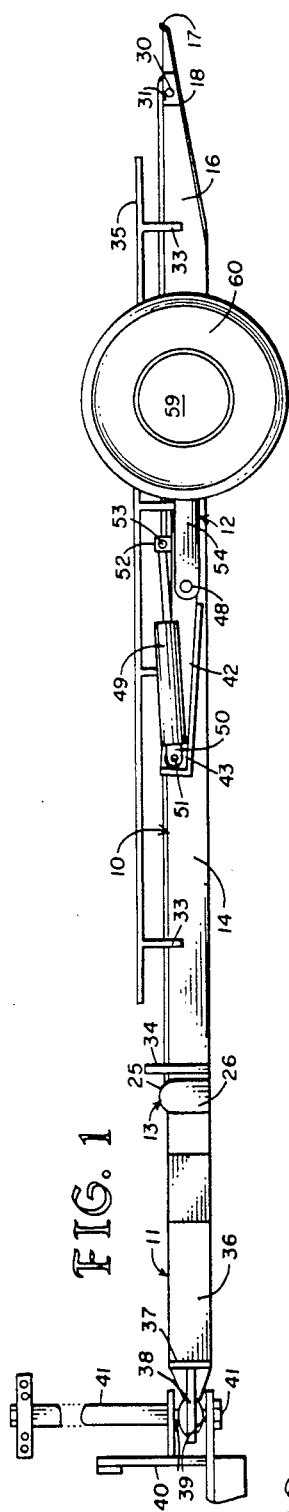
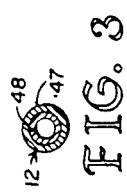
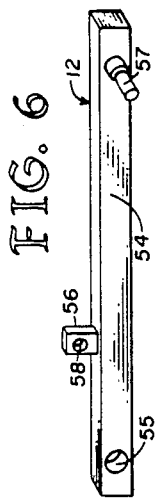
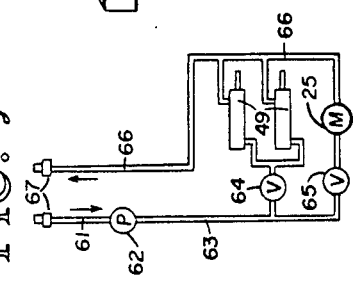
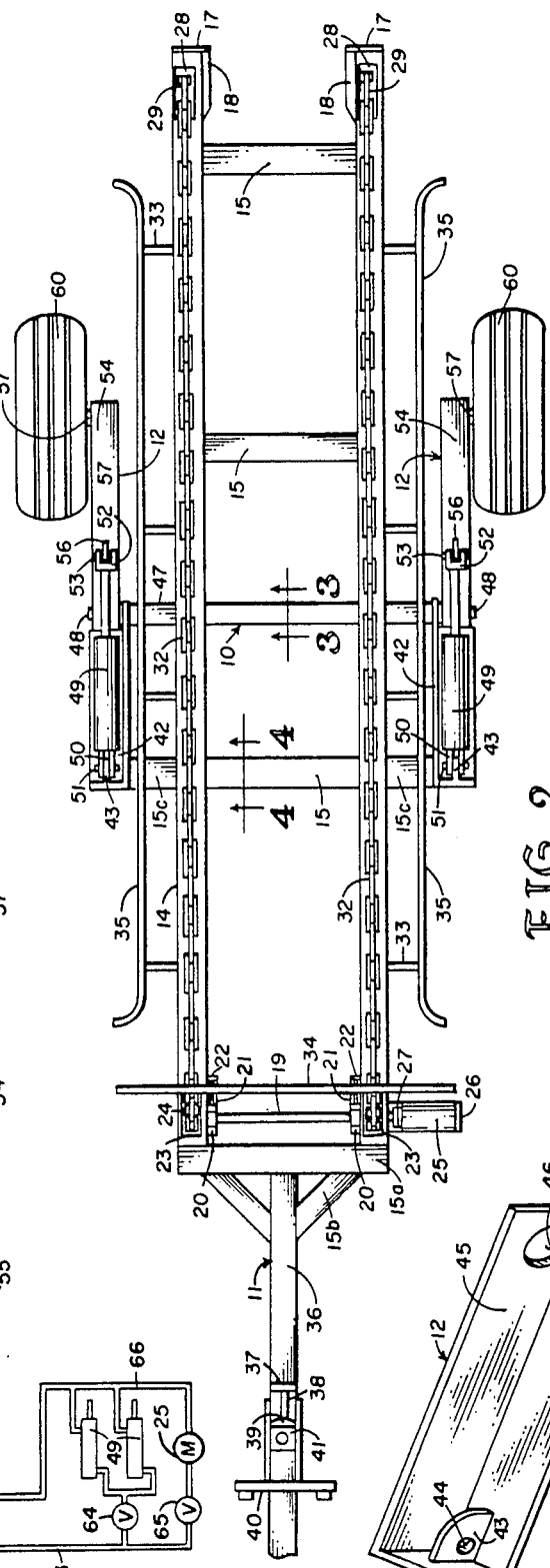

TRAILER FOR LOADING AND HAULING AGRICULTURAL BINS

BACKGROUND OF INVENTION

A. Related Applications

There are no applications related hereto heretofore filed in this or any foreign country.

B. Field of Invention

My invention relates generally to self-loading trailers for hauling agricultural bins and particularly to such a trailer that lowers the rear portion for loading without raising the forward portion.

C. Description of the Prior Art

In the agricultural arts, especially in the Western United States, it has become common to contain freshly harvested agricultural products immediately upon harvest in large boxes or bins located in or immediately adjacent the harvest area. These bins are approximately four feet square on their base and have a vertical height of two to four feet. The bins are normally supported on the earth in the harvest area during their course of filling.

Such bins are used especially in the harvest of oranges, apples and other soft fruit. The bins, once filled, are transported with their contained product to processing or packing areas, and in some cases are even used to transport product to an ultimate retailer. These bins are commonly transported by trailers of various sorts.

As the use of such containers has grown, transport trailers for them have become more sophisticated to provide various features that make their use easier and more simple. Particularly, in the past, such trailers have provided mechanical means to aid the picking up and loading of bins thereon without any required manual manipulation. The pickup and loading functions have generally been accomplished with two-wheeled trailers having opposed wheels medially mounted on an elongate rigid frame commonly formed with lateral beams. Chain-type conveyers have been provided, with a course moving forwardly on the upper surface of the trailer's lateral beams, to move bins therealong as desired. Commonly such trailers are not self-powered but are moved by means of an auxiliary prime mover such as a wheel-type tractor, and in this instance trailer systems generally have been powered by the hydraulic system of that tractor.

To pick up a bin, the rearwardmost portion of the trailer is lowered to approximately the elevation of the earth supporting a bin and the trailer is then manipulated by its propelling vehicle to a position where the bin is centered longitudinally relatively to the trailer. The bin is then moved onto the trailer by activation of the conveyer system on the lateral beams.

In the known art trailers that have been used in this type of operation have generally been of a compound nature with two frames or partial frames that move relative to each other. Such trailers have had a first or tongue frame which provides means for attachment to a prime mover. This first frame generally remains relatively positionally stable to a second frame that is pivotably mounted relative thereto so that its rearward portion may be lowered and as a necessary incident, its forward portion raised. The wheel structure of such a trailer may be carried by either portion. Such trailers that have become known generally have provided some upstanding structural element to mechanically move one frame relative to the other. This type of trailer makes it difficult for an operator of a vehicle propelling the trailer to see the rear portion of the trailer for proper trailer positioning relative to a bin to be loaded since either some trailer part or bins already on the trailer will block the operator's view when the elements be raised as an incident of trailer operation.

My instant trailer alleviates this problem by providing a bell-crank type mounting for the supporting wheels of a bin trailer such that the rearwardmost portion of the trailer may be lowered by raising the wheel structure relative to the trailer. This type of operation firstly allows the use of a unitary frame that is not of a compound nature to allow the structure of the trailer to be lighter, stronger, of cheaper manufacture and more maintenance free. Secondly my trailer does not raise any of its forward portions or contents thereon during the bin loading operation, but rather lowers the forward as well as the rearward portion of the trailer and anything carried thereon below a normal operating level to provide more unobstructed vision for an operator during the loading operation to allow him to better and more easily manipulate the trailer relative to a bin to be loaded, and to perform this operation without second party assistance.

My invention resides not in any of these structural elements or functions per se but rather in the synergetic combination of all of the structures and functions disclosed and claimed.

SUMMARY OF INVENTION

My invention generally provides an elongate trailer of unitary frame construction with rigid space sided beams and a forwardly extending hitch having a ball-type swivel connecting joint.

Paired opposed wheels are carried, in the medial portion of the trailer, on jack axles each supported on opposed laterally positioned bell crank structures to allow the wheels to be moved vertically relative to the trailer frame. Hydraulic means are provided for vertically moving the trailer wheels.

The rearwardmost portion of the trailer frame is tapered to a wedge configuration. Each side beam is provided with an endless chain conveyer, having its forwardly moving course on the upper surface of the beam, to move containers therealong. The conveyer is powered by hydraulic means. Hydraulic power may be supplied preferably by the hydraulic system of the associated tractor that propels the trailer or otherwise by an independent hydraulic system carried by the trailer. Bin alignment structure is provided to appropriately positionally maintain bins on the trailer.

In creating such a device it is:

A principal object of my invention to provide a trailer for self-loading and hauling of bins that during loading does not raise any portion of the trailer, or its contents, above their normal hauling position to provide better operator view of the loading bin operation.

A further object of my invention to provide such a trailer that is formed with a unitary frame which has substantial strength and rigidity for its mass and provides substantially maintenance free operation.

A still further object of my invention to provide such a trailer that may be operated, both for powering and locomotion, by an ordinary tractor of present day commerce without any special adaptation of either tractor or trailer for such purpose.

A still further object of my invention to provide such a trailer that has no structures upstanding substantially above its bed, to aid operator view of the trailer and its environs and aid the loading and handling of bins thereon.

A still further object of my invention to provide such a trailer with a wheel axle that provides a torsion effect to create smooth transport to lessen settling of fruit and bruising.

A still further object of my invention to provide such a trailer that is of new and novel design, of rugged and durable nature, of simple and economic manufacture and one otherwise well adapted to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an orthographic side view of my trailer showing its various parts, their configuration and relationship.

FIG. 2 is an orthographic top or plan view of the trailer shown in FIG. 1.

FIG. 3 is an enlarged vertical cross-sectional view of the pipe support of my trailer, taken on the line 3—3 of FIG. 2, in the direction indicated by the arrows thereon.

FIG. 4 is an enlarged vertical cross-sectional view of a typical channel cross beam of my invention, taken on the line 4—4 of FIG. 2, in the direction indicated by the arrows thereon.

FIG. 5 is a substantially enlarged isometric view of the hydraulic cylinder mounting bracket of the wheel structure of my trailer.

FIG. 6 is a substantially enlarged isometric view of the wheel arm of my trailer.

FIG. 7 is an hydraulic diagram, in normal symbology, of the hydraulic system of my trailer.

DESCRIPTION OF THE PREFERRED EMBODIMENT

My invention generally provides an elongate trailer having frame 10 with forwardly extending tongue structure 11, medial wheel structure 12 and hydraulic powering system 13.

Frame 10 provides elongate side beams 14 structurally innerconnected in spaced parallel relationship by crossbeams 15. The rearward part 16 of each side beam is tapered, as illustrated in FIG. 1, to provide a relatively thin rearwardmost portion 17 for placement beneath a bin to be loaded. Rearward part 16 of the side beams carries skid shoe 18 covering the under surface thereof to provide some protection from the earth underlying a bin to be loaded. Commonly, but not necessarily, the side beams will be provided with bin aligning structure comprising laterally extending support posts 33 carrying alignment rails 35 at a position slightly vertically above the upper surface of the side beams to aid the alignment of bins moving on the trailer and guide them past the wheel sturctures. Bins to be carried by my trailer normally are wider than the distance between trailer side beams, and obviously not so wide as the distance between supporting tires 60 and wheels 59.

Each side beam carries an endless chain conveyer structure with one course on its upper surface. Forward conveyer axle 19 is supported on the inwardly adjacent surfaces each beam by bearings 20 slidably carried on brackets 21 so that they might be moved in an elongate direction by screws 22 engaged in the brackets to loosen and tighten the endless conveyer chain. The upper and lower surfaces of beam 14 define appropriate orifices 23 within which chain cogs 24 are irrotatably carried by conveyer axle 19. Hydraulic motor 25 supported laterally of one side beam by bracket 26 interconnects by coupling 27 with the forward conveyer axle to provide rotary power therefore.

Rearward portion 16 of each side beam defines orifices 28 to allow positioning of rearward conveyer shafts 29 therein with their upper portions extending slightly above the surface of the side beam. These rearward shafts are fixed in the side beam. These rearward shafts are fixed in the side beams and configured to allow the rollers of the conveyor chain to serve as the bearings therebetween.

Elongate endless link chains 32 are carried between forward cogs 24 and rearward shafts 29 in each side beam so that their upward courses are immediately above the upper surface of each side beam 14. Each chain is of the roller type with transverse rollers supporting the chain on trailer side beams and in turn supporting bins resting on the chain.

Forward bin stop 34 extends in a lateral direction between the side beams, immediately rearwardly of the forward conveyer axle, to limit the forward motion of bins. The stop is supported above the upper surface of the side beams and configured with appropriate orifices to allow chain passage therepast.

Tongue structure 11 provides elongate forwardly extending tongue beam 36 extending foreward from structural communication with forwardmost crossbeam 15a of the trailer frame. The structural joinder of these elements is enhanced by similar angled lateral supports 15b communicating from each side of the tongue beam to the lateral portion of the forwardmost crossbeam. The forwardmost part of tongue beam 36 carries structurally interconnected hitch support 37, supporting secondary forward swivelable hitch element 38. This forward swivelable hitch element 38 interconnects with swivel pin 39 carried by primary hitch 40. Hitch 40 is of the ordinary agricultural type to rigidly but releasably interconnect with existing hitch structure of agricultural tractors. The hitch 40 structurally supports vertically upstanding hydraulic hose support structure 41 ad associated upstanding valve support structure to positionally maintain and support the hydraulic hose communicating between tractor and trailer and its associated valve structure.

The structure of bin trailers heretofore described is traditional and has become known and generally standardized, more or less, in the prior art. In that prior art, however, the tongue structure normally constitutes a separate secondary frame that has been movably interconnected to the principle frame of the trailer.

In my invention, wheel structure 12 of my trailer, as shown especially in FIGS. 1 and 2 of the drawings, provides similar mechanism, that would be mirror images of each other, on each side of the medial part of my trailer. Hydraulic cylinder bracket 42 is an elongate structure, illustrated particularly in FIG. 5, with forward cylinder ear 43 defining fastening hole 44 and rearward extending axle fastening side 45 defining support pipe hole 46 in the rearward portion. The cylinder bracket is supported at a spaced distance laterally outwardly from the adjacent side beam in a somewhat elevated positioned in its forward part by laterally extending frame element 15c structurally carried by the trailer frame and its rearward part by axle fastening side 45 communicating with the outer portion of pipe support 47. This angled mounting allows the trailer to be operated in a level position at different heights, which facilitates mounting to different tractors at different hitch heights. It also allows raising the rearward part of the trailer upwardly above level position, which assists in keeping bins on the trailer.

Pipe support 47, 48 extends between frame side beams 14 and for some distance therebeyond to aid in supporting the wheel structure. The pipe support comprises larger outer pipe 47 and somewhat longer and smaller inner pipe 48 that is pivotably carried within and extends somewhat laterally beyond the ends of the larger pipe. Larger outer pipe 47 is structurally integrated with the trailer frame by welding. The axle fastening brackets carry the end parts of pipe 47 in holes 46 where it is interconnected by welding.

Hydraulic cylinders 49 have paired opposed fastening brackets 50 extending therefrom to pivotably interconnect with fastening ears 43 of the cylinder brackets by pin 51 extending therebetween. The body of each hydraulic cylinder lies immediately above the lower surface of its associated cylinder bracket and the piston rod extending from the rearward end extends some distance rearwardly of pipe axle 47 where it carries "U" shaped connecting yoke 52 which pivotably interconnects with the wheel support arms by pins 53 extending therebetween.

Wheel support arms 54 comprise the elongate elements shown especially in FIG. 6. The arms define in their forward end portion axle holes 55 to accept an end part of smaller inner pipe 48, upstanding hydraulic cylinder arms 56 in their medial portions, and in their rearward portions carry wheel jack axles 57 extending laterally outwardly, perpendicular to the longer axis of the arms. Each wheel support arm is structurally supported by the lateral extensions of inner pipe axle 48 extending through hole 55 defined in the forward portion thereof. Cylinder arms 56 define pin holes 58 positoned to fit within yokes 52 of the hydraulic cylinder piston arms and be there pivotably interconnected by pins 53. Wheel jack axles 57 carry ordinary wheel structures 59 which support pneumatic tires 60. Normally hydraulic cylinder arms 56 should angle slightly from the axis of the hydraulic cylinder to assure that the wheel arms may not come into a dead center position relative to the hydraulic cylinder, which would prevent the arms from pivoting vertically upon motion of the piston rod relative to that cylinder.

The hydraulic system of my trailer is shown in the diagram of FIG. 7. The system provides input line 61 which passes hydraulic fluid to pump 62 where it is pressurized and thence passed into manifold line 63. The pressurized fluid is distributed from this manifold line through wheel cylinder control valve 64 and hydraulic motor valve 65. The output from cylinder valve 64 is passed to the two hydraulic cylinders 49 and thence returns through return line 66. I prefer the use of a single valve to control both wheel cylinders so that they move simultaneously, but obviously each could be separately controlled if desired. The output of motor valve 65 is passed through hydraulic motor 25, to move the chain conveyers of my trailer, and thence returns through line 66.

Normally input line 61 and return line 66 will be interconnected with and serviced by the hydraulic system of an associated tractor. Pump 62 may be the pump of that tractor's hydraulic system or may be a second auxiliary pump, if desired or necessary. In an installation which is independent of an associated tractor, the input and output lines of my hydraulic system may be interconnected, preferably by means of a reservoir and a separate powering system (not shown) used to operate pump 62.

Having thusly described the structure of my invention, its operation may be understood.

A trailer is constructed according to the foregoing specification and its tongue 11 releasably interconnected to the hitch of an appropriate propelling vehicle, normally a wheeled tractor. Generally, in use of a trailer such as that of the instant invention, the device is interconnected for bin loading operations to the front of a tractor rather than the rear as it is easier to control and maneuver the trailer in the foreword position. If the hydraulic system of an associated propelling vehicle is to be used to power the hydraulically operated mechanism of my trailer, that system is interconnected by connectors 67 carried by the input and output lines of the trailer hydraulic system. The wheel structure of the trailer should be positioned in a normal traveling mode, that is with trailer frame 10 in a substantially horizontal orientation. If the wheel structure be not in such position, wheel cylinder valve 64 is appropriately adjusted to bring the wheel level into proper position. In this condition the trailer is moved to close proximity of a bin to be loaded and transported.

To load a bin on my trailer the wheel structure is moved upwardly to lower the rearwardmost portion of side beams 14 to a position immediately above the earth supporting the trailer. This is accomplished by operating wheel cylinder valve 64 to allow the pistons of the wheel cylinders to contract within the cylinders to shorten the overall length between the opposed cylinder connecting pins. As this occurs wheel arm 54 will pivot upwardly about its support on pipe 48 and the wheel supported by the wheel arms will consequently move upwardly relative the trailer frame to lower that frame relative to the earth surface on which the wheels are supported. With the trailer in this loading mode, it is manipulated by an attached prime mover to position the rearwardmost portion of side beams 14 medially relative to the side of the bin facing the trailer. The trailer is then moved slightly under the facing surface of the bin so that the forward portion of the bin contacts the rearward portion of conveyer chains 32. Motor valve 65 is then opened to activate conveyer motor 25 and thusly cause the conveyer chains to move their uppermost course in a forward direction relative to the trailer. The bin will be supported by the conveyer chain and the friction generated by this support will tend to cause the bin to move with that chain in a forward direction relative to the trailer. During this motion the bin will be positionally maintained in a lateral aspect by bin guides 35. The bin is moved forwardly until its rearwardmost part is slightly forward of the rearwardmost portion of the side beams of my trailer and, when in this position, motor valve 65 is closed to stop the bin motion.

With the bin so positioned on my trailer, the cylinder valve is operated to lengthen the hydraulic cylinders and thusly move the wheels supporting the trailer downwardly relative to the trailer frame until the trailer frame is substantially horizontal.

With the trailer in this transport mode it may then be moved as desired for disposition of the bin that has been loaded or for loading of other bins in the same fashion as previously described.

When a plurality of bins are to be loaded on my trailer, commonly, the first bin will be moved forwardly only to a position immediately forward of the rearwardmost part of the conveyer chain. The second bin will than be loaded and moved to a similar position and so on until the trailer is filled with bins. If the first bin be moved forwardly to a forwardmost position on the trailer, against forward bin stop 34, the conveyer chains in loading additional bins would move relatively to the bottom of the first bin and tend to cause damage to it.

It is to be noted from the foregoing description, that during all transport and loading operations with my trailer, no portion of the trailer or the load carried are ever moved above the vertical position which they occupy when the trailer is in a normal transport mode. This allows better operator view of the loading operation than is had with a trailer where the forward portion of the trailer or a supported load moves upwardly during the loading operation.

It is further to be noted that there are not upstanding portions of my trailer that extend more than a short distance above the upper surface of the trailer side beams again to aid operator view for easier handling of bins, especially in the loading operation.

It is further to be noted that my trailer operates in loading, unloading and transporting bins in the traditional fashion of trailers heretofore known and may be used with existing bin structures and transport vehicles that heretofore have been used with known trailers without any modification of either those structures or my trailer.

The foregoing description of my invention is necessarily of a detailed nature so that a specific embodiment of it may be set forth as required, but it is to be understood that various modifications of detail, rearrangement and multiplication of parts may be resorted to without departing from its spirit, essence or scope.

Having thusly described my invention, what I desire to protect by Letters Patent and

What I claim is:

1. A trailer for loading and hauling bins comprising, in combination:
    an elongate unitary frame having parallel space side beams interconnected by cross beams
        with tongue structure extending forwardly from the forwardmost crossbeam and having swivelable means of interconnecting with a hitch of a propelling vehicle and
        chain-type conveyers carried by each side beam with each conveyer upper course extending above the associated side beam to aid moving of bins relative to the side beams;
    wheel structure, supporting said frame for locomotion over a supporting surface, having 'elongate cylinder brackets supported by the frame at a spaced distance laterally of each side beam, each cylinder bracket pivotably carrying in its foreward part
        an hydraulic wheel cylinder extending rearwardly in a plane parallel to and laterally of a frame side beam to interconnect with
        a larger outer pipe of a laterally extending pipe support, pivotably supporting a smaller inner axle extending laterally beyond the larger pipe and beyond both hydraulic cylinders, said larger pipe being structurally carried by the frame and supporting one end of each bracket via hole means and
        similar opposed elongate wheel arms pivotably supported in their foreward parts by the smaller inner axle and extending rearwardly therefrom, each wheel arm journaling a wheel in its rearward part and having an upwardly extending hydraulic cylinder arm in a medial portion to pivotally interconnect with the piston of the associated hydraulic cylinder carried on the same side of the frame; and hydraulic means of adjustably powering the conveyers and the wheel cylinders.

2. The invention of claim 1 further characterized by the side beams
    having wedged shape rearward portions with the wedge's apex being horizontal and rearwardmost and
    mounting laterally positioned bin guides to aid in maintaining bins on the trailer against lateral displacement.

3. In an elongate trailer for loading and hauling a plurality of agricultural bins in elongate array, the invention comprising:
    a unitary trailer frame having elongate opposed side beams, conveyer structures associated with the side beams to move bins thereover, and tongue means for releasable and movable interconnection to a powering vehicle;
    similar opposed laterally extending wheel structure supported on each elongate side beam to aid locomotion of the trailer and to move the trailer frame vertically relative to a supporting surface, each said wheel structure having,
        cylinder brackets carried by the side beams at a spaced distance laterally therefrom, said brackets having two perpendicular portions parallel to said beam,
        hydraulic cylinders carried by each cylinder bracket extending rearwardly thereof,
        linear beam-like wheel arms pivotably carried by a coaxial transverse pipe support carried by said opposed side beams and extending laterally therefrom,
        said coaxial pipe support also supporting one end of each bracket via a hole portion and the other end being supported by the trailer frame,
        pneumatic wheels journaled on rearward portions of the wheel arms to extend laterally therefrom, and
        each wheel arm having a medial upwardly extending cylinder bracket to pivotably interconnect the associated hydraulic cylinder to allow that associated hydraulic cylinder to move the wheel arm about its pivot.

* * * * *